Nov. 13, 1956
J. C. MASON
2,770,532
DEVICE FOR REMOVING ARTICLES FROM AND
INSERTING ARTICLES INTO PIPELINES
Filed July 6, 1953
2 Sheets-Sheet 1
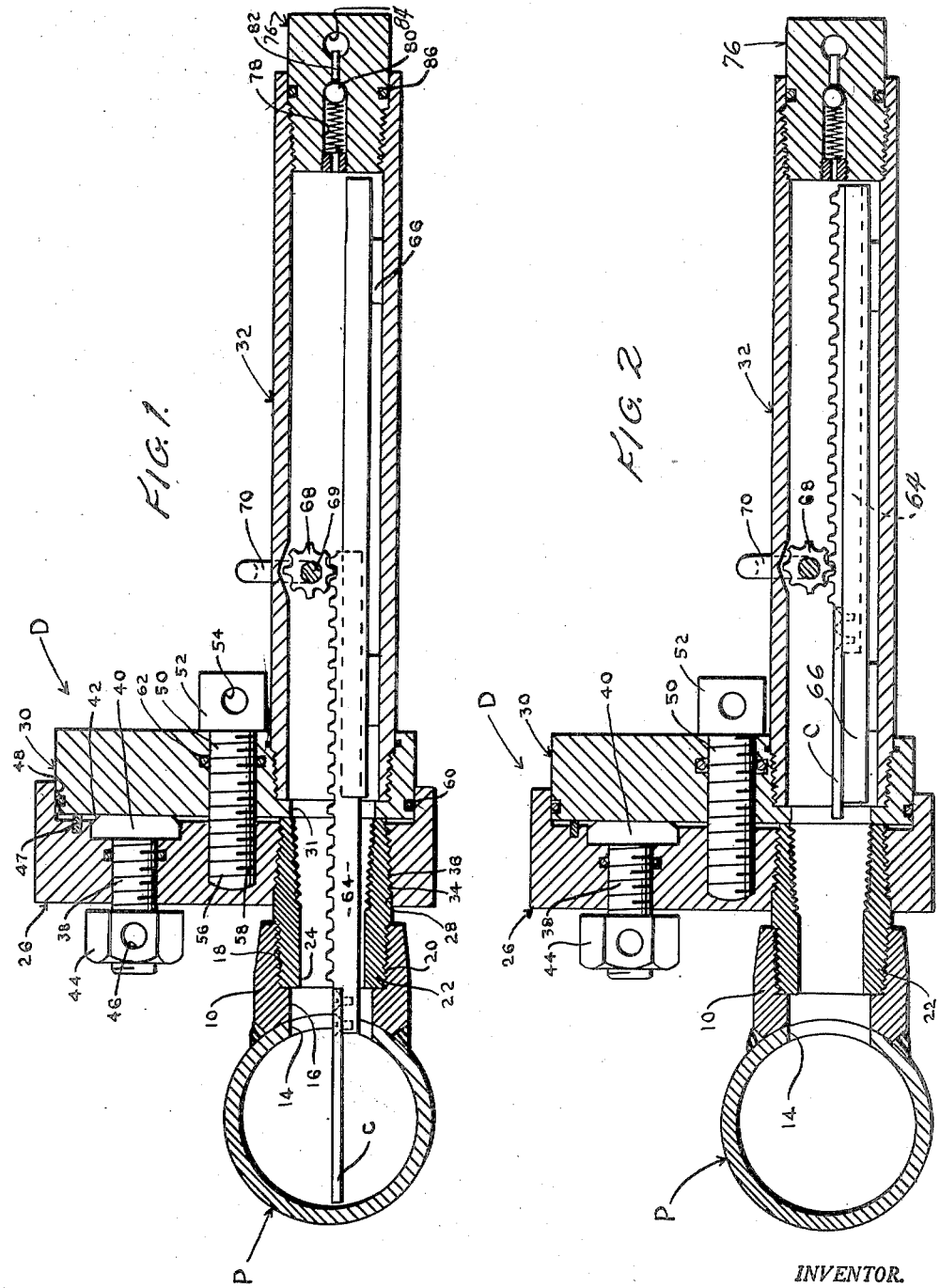
INVENTOR.
JOHN C. MASON
BY
Francis A. Utecht, Jr.
ATTORNEY

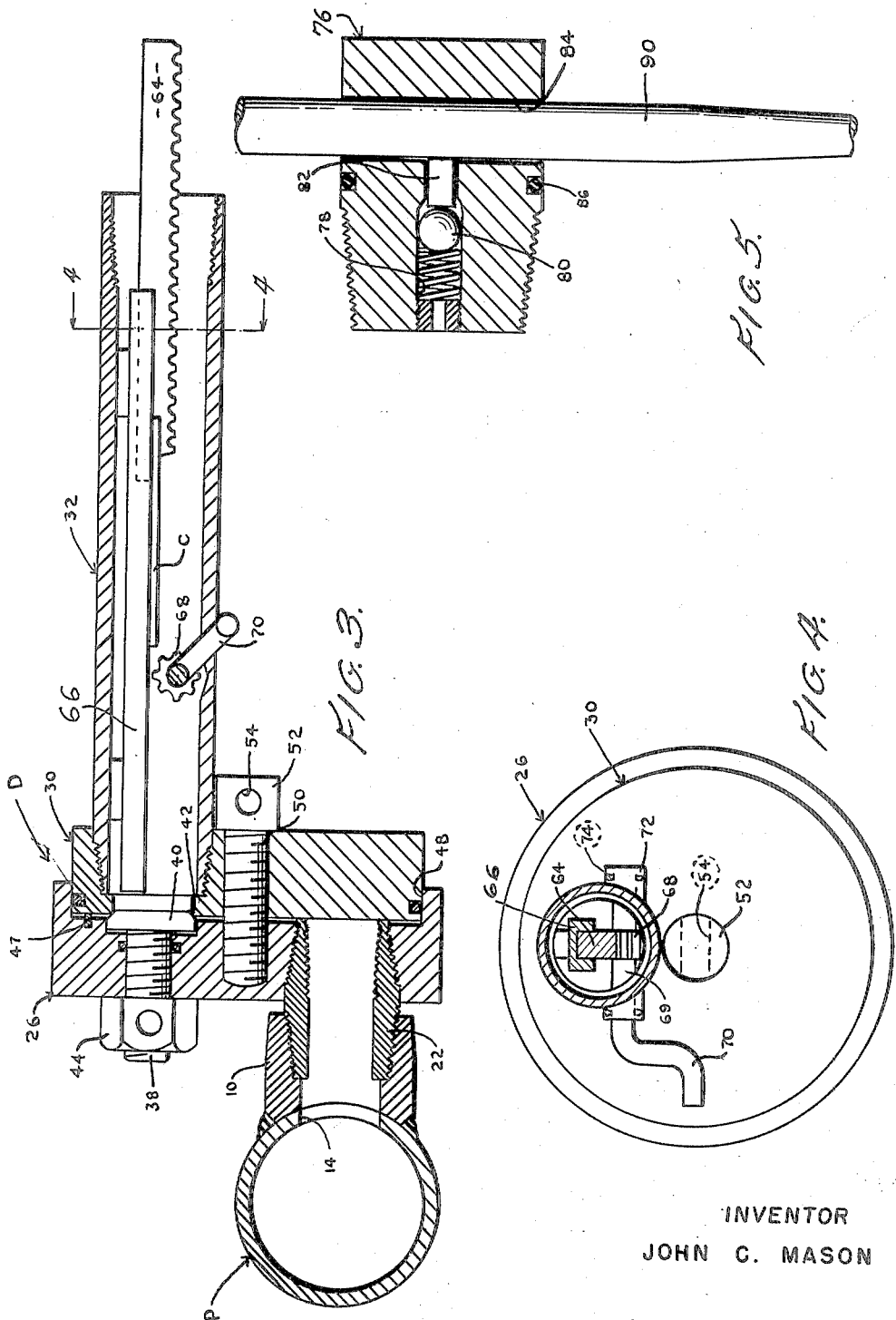

United States Patent Office 2,770,532
Patented Nov. 13, 1956

2,770,532

DEVICE FOR REMOVING ARTICLES FROM AND INSERTING ARTICLES INTO PIPELINES

John C. Mason, Bellflower, Calif.

Application July 6, 1953, Serial No. 366,091

6 Claims. (Cl. 23—253)

The present invention relates generally to pipelines and more particularly to a novel device for removing articles from and inserting articles into a pipeline.

Modernly, pipelines adapted to carry oil, gas and other fluids are widely utilized. In the use of such pipelines it is sometimes necessary to insert and remove articles therefrom without shutting off the flow of liquids therethrough. For example, where the pipeline is utilized to carry a liquid such as crude oil which may include corrosion inducing agents it is customary to position corrosion-measuring coupons within the confines of the pipeline at spaced points therealong. These coupons are removed periodically and carefully weighed and/or measured to thereby afford an indication of the extent to which the inner surfaces of the pipeline have been corroded during the time the coupons were located therein. Inasmuch as the oil being carried by the pipeline will normally exist at the high pressure it is necessary to provide special means for effecting the removal of a coupon from within the pipeline, and the subsequent re-insertion of the same or a new coupon therewithin.

A major object of the present invention is to provide a novel device for removing an article from a fluid-filled pipeline.

It is a more particular object to provide a novel device for effecting the removal from and subsequent re-insertion into a pipeline of a corrosion-measuring coupon.

Another object of the invention is to provide a device of this nature which is particularly adapted for use with a pipeline carrying a fluid existing at high pressure.

A further object is to provide a device of this nature which is light in weight and economical of construction.

An additional object is to provide a device of this nature which is simple and foolproof in operation.

Yet another object is to provide a device of this nature which is simple in design and rugged of construction whereby it may have long service life.

These and other objects of the present invention will become apparent from the following description of a preferred embodiment thereof, when taken in conjunction with the appended drawings wherein:

Figures 1, 2 and 3 are longitudinal vertical sectional views of a preferred form of device embodying the present invention and showing the operation thereof;

Figure 4 is an enlarged vertical sectional view taken on line 4—4 of Figure 3; and, Figure 5 is an enlarged, fragmentary view of a detail of said device.

Referring now to the drawings, the preferred form of article-removing device D embodying the present invention is shown attached to a tubular fitting 10 which is welded to the outside of a pipeline P adjacent an aperture 14 formed in the latter. The bore 16 of the fitting 10 is formed with internal threads 18 shown engaged by the external threads 20 of mounting member 22 having a bore 24. This mounting member 22 serves to mount the article-removing device D to the pipeline P.

The article-removing device D broadly comprises a base disc 26 formed with an opening 28 in its lower portion and rigidly secured to the mounting member 22; a coaxial auxiliary disc 30 rotatably mounted by the base disc 26 and formed with an opening 31 coaxial with opening 28 and aperture 14; a fluid-tight housing 32 rigidly secured to the auxiliary disc and extending away from the latter's opening 31; and, means such as a rack 64 and pinion 68 for effecting reciprocal movement of a corrosion-measuring coupon C relative to the housing 32.

More particularly, the opening 28 of the base disc 26 is formed with threads 34 engageable with external threads 36 formed on the mounting member 22. Spaced diametrically opposite the opening 31 of the auxiliary disc is a bolt 38 having a head 40. The radial distance from the axis of rotation of the disc 30 to the axis of the bolt 38 is equal to the radial distance from said axis of rotation to the axis of the opening 31. This bolt 38 is held in place by a nut 44, and the end of the bolt, as well as the nut 44 is formed with a common transverse bore 46. A guide pin 47 is mounted by the rear of the base disc adjacent the bolt 38. The rear portion of the base disc 26 is formed with a circular recess 48 wherein the auxiliary disc 30 is coaxially disposed.

The auxiliary disc 30 is rotatably secured to the center of the base disc by means of a pivot bolt 50 having a head 52 formed with a transverse bore 54. The threads 56 of this bolt 50 engage a threaded cavity 58 coaxially formed in the base disc 26. Resilient seal rings 60 and 62, respectively, may be interposed between the two discs and between the pivot bolt 50 and disc 30.

The housing 32 is preferably cylindrical in cross-section and its front end is threadably secured within the opening 31 of the auxiliary disc. The rack 64 is slidably mounted within the housing 32 by a rack support 66. The pinion 68 is keyed to the shank 69 of a crank 70, which shank is journaled by sleeves 72. Seals 74 may be interposed between the shank 69 and the inner surfaces of the sleeves 72.

The rear end of the housing 32 is closed by a closure plug 76 shown threadably secured therein. This closure plug 76 is coaxially formed with an axial passage 78 normally closed by a spring-loaded ball 80. A pin 82 is axially slidably mounted by the closure plug adjacent the ball 80. A transverse bore 84 is formed in the closure plug rearwardly of the passage 78 so as to intersect the latter. The front of the pin 82 extends into bore 84. A seal ring 86 may be interposed between the closure plug and the housing 32.

In the operation of the article-removing device D, referring to Figure 1, the coupon C is normally disposed within the confines of the pipeline P. When it is desired to remove the coupon from the pipeline, the crank 70 is first rotated so as to cause the rack 64 to be retracted within the housing 32, as shown in Figure 2. During such retraction little force need be applied to the crank inasmuch as there is but a slight differential in area between the front and the rear ends of the rack. Next, a wrench is inserted through the bore 54 of the pivot bolt 50 whereby this bolt may be loosened. If the wrench is of sufficient length it may then be used to rotate the auxiliary disc 30 about the pivot bolt 50 so as to urge it to its position of Figures 3 and 4. In its rotated position the front of the opening 31 of the auxiliary disc 30 will be aligned with the head 40 of the valve seat bolt 38. This bolt 38 may then be urged rearwardly relative to the auxiliary disc by means of the nut 44. In this manner the front of the opening 31 will seat upon the bolt head 40. The lower portion of the auxiliary disc will seat against the rear periphery of the mounting member 22. During the rotation of the auxiliary disc relative to the base disc the front of the auxiliary disc will be maintained in a vertical plane by engagement with the rear of the guide pin 47.

Referring now to Figure 5, it is now possible to insert a wrench 90 into the bore 84 of the closure plug 76. Such insertion causes the pin 82 to unseat the ball 80 so as to open the interior of the housing 32 to the atmosphere. In this manner the high-pressure fluid trapped within the housing will be bled off to the atmosphere. The closure plug 76 may then be unscrewed from the housing, the rack 64 removed therefrom, and the coupon C recovered.

It will be apparent that various modifications and changes may be made with respect to the foregoing description without departing from the spirit of the invention or the scope of the following claims.

I claim:

1. A device for removing and inserting an article through an aperture formed in a pipeline, comprising: a base disc, said base disc being formed with an opening that is aligned with said aperture means for mounting said base disc on said pipeline adjacent said aperture; a coaxial auxiliary disc rotatably mounted on said base disc adjacent thereto, said base disc being formed with an opening that is alignable with the opening in said base disc when said auxiliary disc is disposed in a first position, said auxiliary disc being rotatable to a second position wherein its opening is misaligned with the opening in said base disc whereby the latter is blocked; a fluid-tight housing mounted upon said auxiliary disc in line with the opening formed therein and in communication therewith, said housing extending axially away from the side of said disc remote from said pipeline; means for holding said article; and a mechanism disposed within said housing for effecting axial movement of said last-mentioned means relative to said housing through said openings and said aperture.

2. A device as set forth in claim 1 where said mechanism includes a rack axially slidably carried within said housing and a pinion rotatably carried by said housing and engaged with said rack.

3. A device as set forth in claim 1 where the end of said housing remote from said discs is provided with a closure plug formed with an axial passage that is in communication with the interior of said housing and a transverse bore that intersects said passage, a spring-loaded valve is carried by said plug for normally closing said passage, and pin means are carried in said passage between said valve and said bore and extending into said bore.

4. A device as set forth in claim 1 where a seat is formed upon the side of said base disc facing said auxiliary disc, the opening formed in said auxiliary disc being aligned with said seat when said auxiliary disc is disposed in said second position.

5. A device as set forth in claim 2 where the end of said housing remote from said discs is provided with a closure plug formed with an axial passage that is in communication with the interior of said housing and a transverse bore that intersects said passage, a spring-loaded valve is carried by said plug for normally closing said passage, and pin means are carried in said passage between said valve and said bore and extending into said bore.

6. A device as set forth in claim 2 where a seat is formed upon the side of said base disc facing said auxiliary disc, the opening formed in said auxiliary disc being aligned with said seat when said auxiliary disc is disposed in said second position.

References Cited in the file of this patent

UNITED STATES PATENTS

| | | |
|---|---|---|
| 980,665 | Ord | Jan. 3, 1911 |
| 1,769,463 | Rice | July 1, 1930 |
| 2,217,216 | Davis | Oct. 8, 1940 |
| 2,615,339 | Holgersson et al. | Oct. 28, 1952 |
| 2,686,611 | Burke | Aug. 17, 1954 |